United States Patent [19]
Lutz et al.

[11] 4,343,009
[45] Aug. 3, 1982

[54] FACSIMILE RECORDER

[75] Inventors: Felix Lutz, Stuttgart; Gerhard Seibold, Remseck; Gerhard Wessel, Stuttgart; Joachim Lauckner, Korntal, all of Fed. Rep. of Germany

[73] Assignee: International Standard Electric Corporation, New York, N.Y.

[21] Appl. No.: 261,295

[22] Filed: May 7, 1981

[30] Foreign Application Priority Data

May 14, 1980 [DE] Fed. Rep. of Germany ...... 3018452

[51] Int. Cl.$^3$ .............................................. G01D 15/14
[52] U.S. Cl. ......................................................... 346/108
[58] Field of Search ............................................. 346/108

[56] References Cited

U.S. PATENT DOCUMENTS

| | | |
|---|---|---|
| 1,751,584 | 3/1930 | Hansell .................... 346/108 UX |
| 3,220,013 | 11/1965 | Harris ....................... 346/108 UX |
| 3,573,847 | 4/1971 | Saccadoti ................. 346/108 UX |

FOREIGN PATENT DOCUMENTS

| | | |
|---|---|---|
| 2322473 | 11/1974 | Fed. Rep. of Germany . |
| 2557254 | 6/1977 | Fed. Rep. of Germany . |
| 2631849 | 1/1978 | Fed. Rep. of Germany . |
| 1177113 | 1/1970 | United Kingdom . |
| 1405675 | 9/1975 | United Kingdom . |

OTHER PUBLICATIONS

Electronic Design 15, Jul. 19, 1979, vol. 27, pp. 31 & 32, Light Gates Give Data Recorder Improved Hardcopy Resolution.

*Primary Examiner*—Donald A. Griffin
*Attorney, Agent, or Firm*—A. Donald Stolzy

[57] ABSTRACT

A device for controlling the spot elements of an optically controllable component in a facsimile recorder which permits a high writing speed with minimum circuitry. The plurality of spot elements of the controllable optical component are combined in n groups of $m>1$ spot elements each, the m spot elements of a group forming a partial line. The individual partial lines are energized successively in time, while their m spot elements are energized simultaneously, the respective $n-1$ nonenergized partial lines completely blocking the light flux.

11 Claims, 4 Drawing Figures

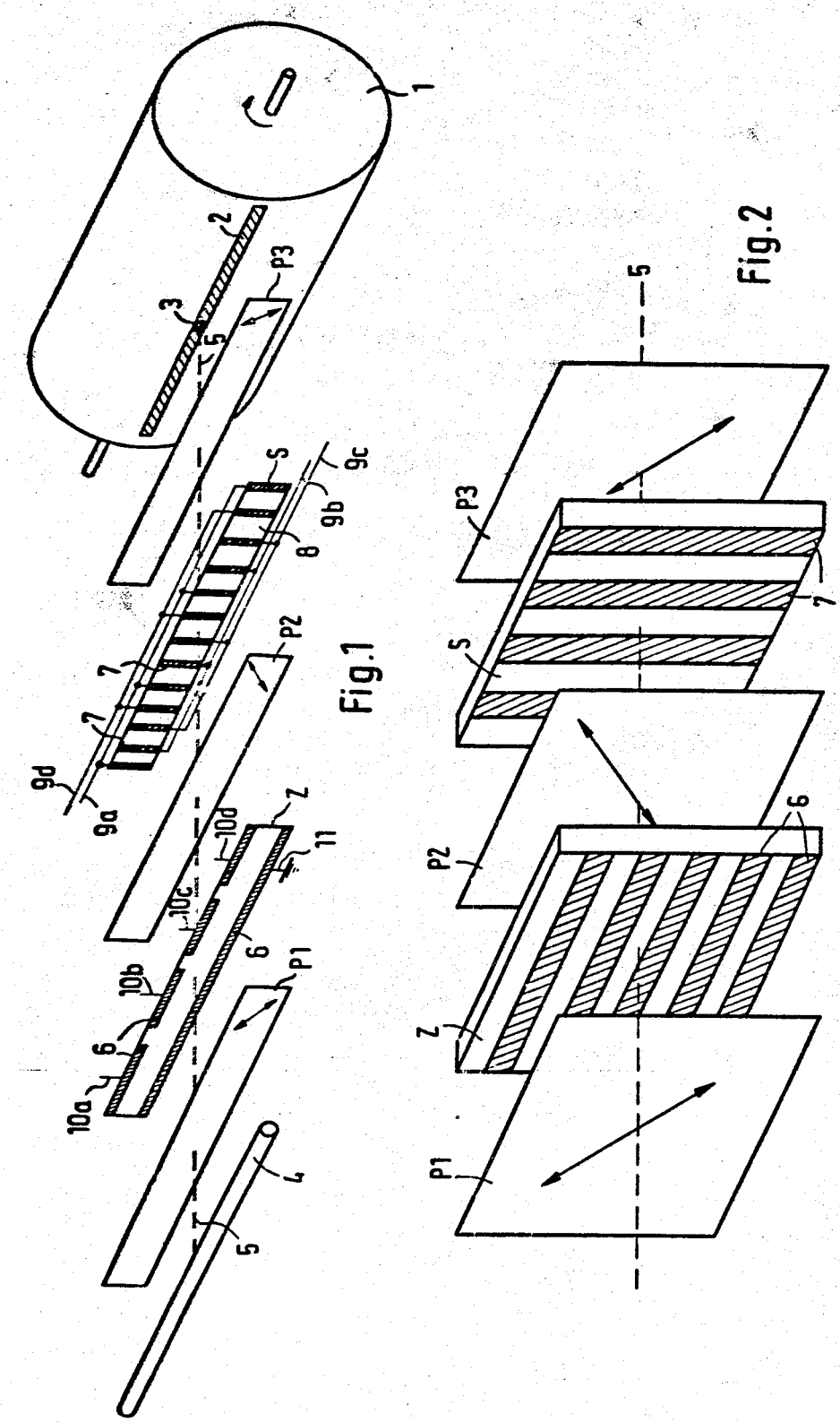

FACSIMILE RECORDER

BACKGROUND OF THE INVENTION

Facsimile recorders employing a light-sensitive record medium, photographic printing paper or an intermediate record medium and containing an electrically controllable optical component with spot elements which block or pass light, have been disclosed in the prior art. An optical printer with a magnetically controllable optical component is described in a paper by B. Hill and K. P. Schmidt, "Integrierte Lichtmodulationsmatrizen aus magnetooptischem Eisengranat fur neuartige Datensichtgerate und optische Drucker", NTG-Fachberichte, Vo. 67, Berlin, pages 107 to 116.

Current commercially available remote copiers have a resolution of 3.85 lines/mm and a transmission period of one to six minutes per DIN-A4 page, the spots of each line being recorded one after the other. The next generation of such remote copiers is to have a resolution of 7.7 lines/mm and a transmission period of 5 to 20 seconds. This means that 1,728 spots will be recorded in each line of a DIN-A4 page. This will increase the amount of circuitry required to drive the controllable optical component. The parallel recording of the spots necessitates storing the input signals, which further increases the amount of drive circuitry required.

What would be desirable therefore is to provide a device for controlling the spot elements of an optically controllable component in a facsimile recorder which permits a high writing speed with minimum circuitry.

SUMMARY OF THE PRESENT INVENTION

The present invention provides a device for controlling the spot elements of an optically controllable component in a facsimile recorder which permits a high writing speed with minimum circuitry.

The plurality of spot elements of the controllable optical components are combined in n groups of $m > 1$ spot elements each, the m spot elements of a group forming a partial line. The individual partial lines are energized successively in time, while their m spot elements are energized simultaneously, the respective $n-1$ nonenergized partial lines completely blocking the light flux.

It is an object of the present invention to provide a device for controlling the spot elements of an optically controllable component in a facsimile recorder which permits a high writing speed with minimum circuitry.

It is a further object of the present invention to provide a device for controlling the spot elements of an optically controllable component in a facsimile recorder which permits a high writing speed with minimum circuitry, the plurality of spot elements of the controllable optical component being combined in n groups of $m > 1$ spot elements each, the m spot elements of a group forming a partial line, the individual partial lines being energized successively in time, while their m spot elements are energized simultaneously, the respective $n-1$ nonenergized partial lines completely blocking the light flux.

DESCRIPTION OF THE DRAWING

For a better understanding of the invention as well as other objects and further features thereof, reference is made to the following description which is to be read in conjunction with the drawing wherein:

FIG. 1 shows the principle of a facsimile recorder according to the invention with an electrically controllable optical component;

FIG. 2 shows an arrangement in which the switching elements are intersections of switchable rows and columns of ferroelectric ceramic plates;

DESCRIPTION OF THE PREFERRED EMBODIMENT

Figure 3:
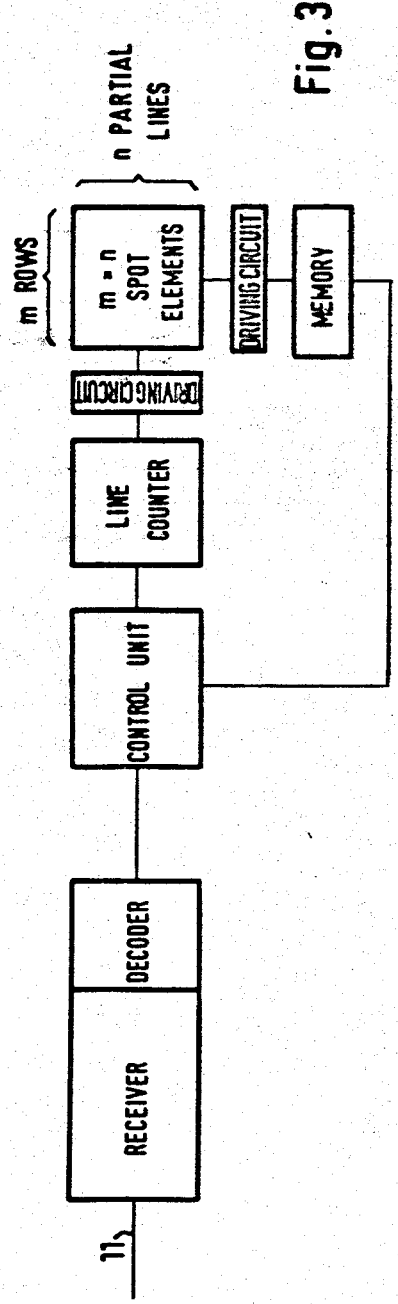
FIG. 3 shows the information flow in a facsimile recorder according to the invention.

FIG. 1 shows a drum recorder consisting of an aluminum drum coated with a light-sensitive record medium such as selenium. On this record medium, a line 2 is to be written, which is shown hatched. A spot 3 on the line is indicated as a circle where a dashed light beam 5 from a lamp 4 strikes the drum. The light emitted by the lamp is switched by a controllable optical component consisting of three fixed polarizers P1, P2 and P3, which differ in their polarizing directions by 90°, and intermediate, electrically controllable polarizers Z and S. Suitable controllable polarizers are liquid crystals which rotate the plane of polarization, or birefringent materials whose birefringence is controllable by electric or magnetic fields. If liquid crystals are employed, the fixed polarizers may be rotated about the light-beam axis by any angle; if birefringent materials are used, the fixed polarizers must be rotated by 45° with respect to the field direction.

Arranged in the light path, advantageously behind the lamp 4 and in front of the drum 1, are focusing lenses, which are not shown in FIG. 1 for clarity. All components in the light path have at least the width of the line 2 to be written on the drum. The charge pattern on the intermediate record medium 1 after the recording step is finally transferred to a sheet of paper as the final record medium.

The subarrangement consisting of the two fixed polarizers P2, P3 and the controllable polarizer S will be described first. The two crossed fixed polarizers P2, P3 extinguish the light as long as the plane of polarization of light is not rotated by the controllable polarizer S. Materials suitable for such a controllable polarizer are, for example, liquid crystals, ferroelectric materials, and magnetooptical materials. The choice of the material depends on the requirements imposed on switching behaviour, contrast, temperature range, etc. In this embodiment, the polarizers S and Z are ferroelectric ceramic plates coated with row electrodes 6 and column electrodes 7, respectively.

In a practical example, the ceramic plate is made of lead lanthanum zirconate titanate (PLZT) and is 0.5 mm thick. At an electrode spacing of about 130 μm as is necessary to accommodate 1,728 switching elements in a line whose length is equal to the width of one DIN-A4 page, the voltage required to rotate the plane of polarization of the light by 90° is in the range from about 100 to about 250 V.

Each portion between two electrodes 7 of the controllable polarizer S is a spot element 8. The polarizer S of FIG. 1 has twelve such spot elements. By applying predetermined voltages to all electrodes, all spot elements can be simultaneously turned on or off, depending on whether or not a voltage difference exists between the two electrodes limiting the spot element.

Twelve spot elements require thirteen electrodes, and 1,728 spot elements consequently require 1,729 electrodes, which must all be energizable at the same time. To reduce this circuit complexity, the spot elements of the line are combined in groups each forming a partial line. In FIG. 1, four partial lines each consisting of three spot elements are shown on the controllable polarizer S. To energize three spot elements, four electrodes are required.

FIG. 1 shows a preferred embodiment in which first, second, third, and fourth electrodes of each partial line are interconnected, so that only four terminals 9a to 9d are necessary for the twelve spot elements shown. Correspondingly, if 1,728 spot elements are grouped in 27 partial lines of 64 spot elements each, only 65 terminals are necessary for the controllable polarizer S with the column electrodes. Alternately, first the four electrodes of the first partial line could be subjected to voltages corresponding to the pattern to be imaged, then the four electrodes of the second partial line, etc. However, this arrangement would increase circuit complexity.

If no further steps were taken, the arrangement described so far, i.e., the two fixed polarizers P2, P3 and the controllable polarizer S, would only be suitable for imaging a periodic line pattern. To select the respective partial line, an additional variable polarizer Z, coated with row electrodes 6, is interposed between the fixed polarizers P1 and P2. One of the parallel electrodes is divided and provided with terminals 10a, 10b, 10c and 10d. The counterelectrode is grounded at 11.

When a voltage is applied between the terminals 10a and 11, the first partial line is switched to the transparent state. At the same time, the voltages serving to reproduce the image information are applied to the electrodes 9a to 9d of the second controllable polarizer S. Then the second partial line is switched to the transparent state, and the voltages representing the information content for this second line are applied to the electrodes 9a to 9d. In this manner, switching is effected partial line by partial line, while all other partial lines block the light from the lamp 4.

With the 1,728 spots to be actually recorded per line, grouping in 27 partial lines of 64 spot elements each is currently particularly advantageous. This keeps the amount of drive circuitry required small and makes it possible to observe the required copying times. If, for example, only two partial lines with 864 spot elements to be energized simultaneously are present, the drive circuitry required is still considerable. If, however, the spot elements were grouped in, e.g., 216 successively energizable partial lines of eight spot elements each, the required printing time could not be achieved. A combination in groups of a multiple of 8 or 16 spot elements is advantageous because the memories commonly used are 8- or 16-bit memories.

FIG. 2 shows an arrangement of the fixed polarizers P1, P2 and P3 and the controllable polarizers Z and S in which the partial lines and electrodes 6 on the polarizer Z are not arranged side by side but parallel to each other and one below the other in a sandwich configuration. Correspondingly, the spot elements on the controllable polarizers S which are combined to form partial lines, are arranged one below the other, and their electrodes 7 are no longer interconnected but are designed as continuous column electrodes. The electrode terminals are not shown. With n partial lines and m columns, a total of m×n spot elements are obtained which, however, are no longer arranged in a line but form a matrix array. With such an arrangement, the recording line can no longer be imaged directly on the record medium. Therefore, an optical fiber is placed behind each of the m×n spot elements. The other end of the optical-fiber bundle thus formed is fanned out in front of the record medium in the form of a line. To obtain the necessary resolution of 130 μm for a recording spot, it has proved necessary to provide the fiber output on the side of the record medium with a focusing lens.

FIG. 3 is a block diagram showing the information flow in a facsimile recorder according to the invention. Over a telephone line 11 the signal reaches a receiver 12 of conventional design. The latter may have a decoder 13 connected to it if the data are transmitted in coded form. From there, the data are passed to a control unit 14 which feeds into a memory 15 for the drive voltages of the column electrodes 7. When, with 27 rows and 64 columns, the values for all 64 columns have been stored, the control unit 14 applies a voltage through the line counter 17 and the row driving circuit 18 to the row electrodes 6 to energize a partial line. Then after 64 values for energizing the columns are collected, and when the new 64 values are present, changeover to the next row is effected.

The control, memory, and line-counter circuits are commercially available components, or their functions are implemented with a microcomputer. To energize the electrodes, use can be made of thin-film transistors as are described, for example, in a paper by T. Kallfass and E. Lüder, "Dünnschichttransistoren in $Ta_2O_5$ als Gateoxid, hergestellt mit Photolitographie and Ätztechnik", 9. Freiburger Arbeitstagung. Flüssigkristalle, Freiburg, Apr. 26 and 27, 1979.

If, instead of the arrangements described so far, in which the optically controllable component consists of two variable polarizers between three fixed polarizers, a simpler arrangement with only one controllable polarizer between two fixed polarizers is used, a simple multiplex drive can be employed in a facsimile recorder of the kind proposed. The disadvantage of such a simplified optically controllable component is its reduced contrast ratio.

To energize a spot element, a sufficient voltage must be applied between the two electrodes associated with the spot element. To achieve multiplexibility, the optically active material must exhibit a pronounced switching behaviour, i.e., at a voltage U the spot element is energized, but at a voltage U/2 it is not.

Figure 4:
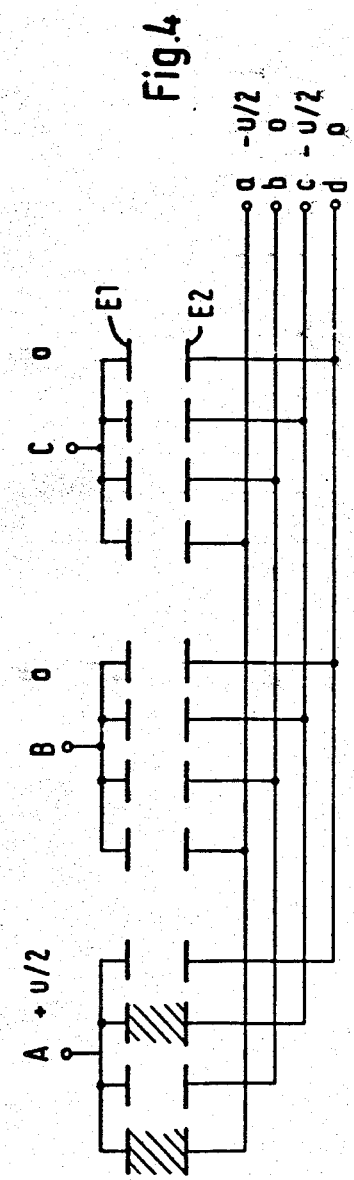
FIG. 4 shows an arrangement of the electrodes of the controllable polarizer of a facsimile recorder according to the invention.

A possible electrode arrangement is shown in FIG. 4. Three electrode groups each having the length of one partial line and consisting of four interconnected first electrodes E1 for four spot elements, are designated A, B and C. Associated with each of these electrode groups are four shorter, second electrodes E2 as counterelectrodes whose overall length is just equal to the length of one partial line. Corresponding counterelectrodes E2 of the groups, i.e., all first electrodes, for example, are interconnected. The counterelectrode terminals are designated a, b, c d. Each area between a partial-line electrode and a shorter counterelectrode corresponds to one spot element. If a ferroelectric material is used, the electrodes are deposited on the surface of this material; if liquid-crystal or colloidal layers are employed, the partial-line electrodes A, B, C are deposited on the interface on one side of the layer, while the shorter counterelectrodes are deposited on the other interfaces.

It will now be assumed that the voltage +U/2 is applied to the electrodes A of a partial line, while the voltage −U/2 is applied to the counterelectrode terminals a and c. The spot elements between the electrodes A of the partial line and the counterelectrodes a and c are then switched to the transparent state, which is indicated by a hatching. The voltages at all other electrodes are assumed to be zero. Thus, there exist maximum voltage differences of only +U/2 or −U/2, which, however, are assumed to be insufficient for activating the respective spot element. By applying the voltage of +U/2 to one partial line after the other, and simultaneously applying voltages of 0 or −U/2, depending on the information to be imaged, to the corresponding counterelectrodes, a facsimile recorder of the kind proposed is obtained. Other electrode arrangements capable of being driven in multiplex mode, such as matrix arrays, are also possible, of course.

In the foregoing, only facsimile recorders with a passive controllable optical component, i.e., a light switch, were described. A facsimile recorder as proposed and using a controllable optical component with light-emitting spot elements works in the same way, of course. Suitable light-emitting spot elements are light-emitting diodes, plasma cells or other light-emitting devices in which a plurality of controllable light emitters can be arranged closely side by side, typically with a spacing of about 100 μm.

Although only facsimile recorders with intermediate record media were described hereinabove, the proposed recorder may utilize photosensitive paper for direct imaging if the spectral characteristic and light intensity of the lamp are adjusted thereto.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A recorder for recording image information line by line on a record medium comprising means for generating light flux, a controllable optical component responsive to said light flux and having means associated therewith for forming a plurality of spot elements from which spots of light are directed onto said record medium along the length of a recording line, the plurality of spot elements formed by said controllable optical component being combined in n groups of m>1 spot elements each, the m spot elements of a group forming a partial line, and means for energizing the individual partial lines successively in time, the m spot elements being energized simultaneously, the unenergized respective n-1 partial lines blocking the light flux incident thereon.

2. A recorder as claimed in claim 1 wherein the controllable optical component is a light-switching, electrically or magnetically controllable component.

3. A recorder as claimed in claim 2 wherein the controllable component comprises polarizers with fixed polarizing directions and an energizable liquid crystal cell interposed between at least two of said fixed polarizers.

4. A recorder as claimed in claim 2 wherein the controllable component comprises fixed polarizers and a layer between at least two of said fixed polarizers whose birefringence properties are magnetically or electrically controllable.

5. A recorder as claimed in any one of the preceding claims, wherein the individual partial lines are arranged side by side in series.

6. The receiver as claimed in claim 5, wherein the partial lines arranged side by side in series occupy the length of one recording line, and that the record medium is exposed directly and point by point to the light beams issuing from the light source and passing through the energized spot elements of the controllable component.

7. A recorder as claimed in claim 5, wherein the length of the partial lines arranged in series differs from that of a recording line, and that the light emerging from the individual activated spot elements is transmitted to the record medium through optical fibers.

8. A recorder as claimed in any one of claims 1 to 4, wherein the individual partial lines are arranged in an arbitrary configuration, and that the light emerging from the individual energized spot elements of these partial lines is transmitted through optical fibers to the record medium so as to form recording spots distributed over the recording line.

9. A recorder as claimed in claim 8, wherein the individual partial lines are arranged one below the other and form the rows of an n×m matrix.

10. A facsimile recorder as claimed in claim 3 or 4, wherein the controllable optical component consists of two separately controllable polarizers arranged one behind the other and each interposed between two of a total of three fixed polarizers differing in their polarizing directions by 90°, one of the controllable polarizers being switchable along n parallel rows, the second controllable polarizer being switchable along n parallel columns normal to the rows.

11. A recorder as claimed in claim 1, wherein a first electrode and a second electrode are associated with each spot element, groups of m first electrodes each forming one partial line, the electrodes of which are conductively interconnected to thus form partial-line electrodes, each of the second electrodes of each group being energizable via second electrode terminals and connected to the corresponding electrode of the other group, a first potential being applied to one partial-line electrode after the other while a second potential is applied to those second-electrode terminals whose associated spot element is to be energized in the respective partial line, all other electrodes being simultaneously at a third potential, only the difference between the applied potentials exceeding a threshold voltage for that spot element.

* * * * *